US006694384B1

(12) United States Patent
Moeller et al.

(10) Patent No.: US 6,694,384 B1
(45) Date of Patent: Feb. 17, 2004

(54) METHOD AND SYSTEM TO REMOTELY CONFIGURE BUSINESS OFFICE DEVICES TO USER DEFINED PARAMETERS

(75) Inventors: Bruce Moeller, Barrington, IL (US); Roland Simonis, Evanston, IL (US); Mandy Chubin, Chicago, IL (US); Alan Jenks, Elgin, IL (US); Alan Mersereau, Geneva, IL (US); Price Hodson, Glen Ellyn, IL (US)

(73) Assignees: Bell & Howell Document Management & Products Company, Arlington Heights, IL (US); Bowe Bell & Howell Scanners, L.L.C., Lincolnwood, IL (US)

( * ) Notice: Subject to any disclaimer, the term of this patent is extended or adjusted under 35 U.S.C. 154(b) by 0 days.

(21) Appl. No.: 09/352,441

(22) Filed: Jul. 13, 1999

(51) Int. Cl.[7] ............................. G06F 3/00; G06F 13/00
(52) U.S. Cl. ............................. 710/8; 710/10; 710/14; 710/100; 713/1; 713/2; 717/11; 717/173; 705/440; 379/93.11; 379/102.02; 379/106.03
(58) Field of Search ............................. 710/100, 8, 10, 710/14; 399/1, 8; 717/11, 173; 379/102.02, 93.11, 106.03; 364/138; 713/1, 2; 705/410

(56) References Cited

U.S. PATENT DOCUMENTS

| | | | | |
|---|---|---|---|---|
| 4,766,548 A | | 8/1988 | Cedrone et al. ............. 700/236 |
| 5,402,528 A | * | 3/1995 | Christopher et al. ......... 358/1.9 |
| 5,412,779 A | | 5/1995 | Motoyama ...................... 399/8 |
| 5,442,541 A | * | 8/1995 | Hube et al. .................. 364/138 |
| 5,459,552 A | | 10/1995 | Ohira ............................. 399/1 |
| 5,509,070 A | * | 4/1996 | Schull ........................... 380/46 |
| 5,548,633 A | | 8/1996 | Kujawa et al. ........... 379/93.11 |
| 5,553,144 A | * | 9/1996 | Almquist et al. ............ 713/100 |
| 5,559,933 A | | 9/1996 | Boswell ...................... 358/1.15 |
| 5,568,618 A | | 10/1996 | Motoyama ................... 710/100 |
| 5,636,337 A | | 6/1997 | Boenke et al. ............... 345/629 |
| 5,649,120 A | | 7/1997 | Motoyama ................... 710/100 |
| 5,659,670 A | | 8/1997 | AuClair ....................... 358/1.16 |
| 5,720,015 A | | 2/1998 | Martin et al. ............... 358/1.15 |
| 5,721,880 A | | 2/1998 | McNeill, Jr. et al. ......... 703/25 |
| 5,727,215 A | * | 3/1998 | Rynaski et al. ............. 717/173 |
| 5,754,748 A | | 5/1998 | Rivers et al. ............... 358/1.17 |
| 5,805,441 A | | 9/1998 | Yamashita ...................... 700/1 |
| 5,812,857 A | * | 9/1998 | Nelson et al. ............... 717/173 |
| 5,815,426 A | | 9/1998 | Jigour et al. .................. 365/51 |
| 5,818,441 A | | 10/1998 | Throckmorton et al. ..... 345/717 |
| 5,819,013 A | | 10/1998 | Marti et al. ................. 358/1.15 |
| 5,822,216 A | | 10/1998 | Satchell, Jr. et al. ........ 700/232 |
| 5,852,658 A | | 12/1998 | Knight et al. ........... 379/106.03 |
| 5,887,216 A | | 3/1999 | Motoyama ...................... 399/8 |
| 5,894,416 A | | 4/1999 | Kuroyanagi et al. ........... 700/9 |
| 5,956,505 A | * | 9/1999 | Manduley .................... 705/410 |
| 6,009,153 A | * | 12/1999 | Houghton et al. ....... 379/102.02 |
| 6,272,469 B1 | * | 8/2001 | Koritzinsky et al. ........... 705/2 |
| 6,317,878 B1 | * | 11/2001 | Saito .......................... 717/11 |
| 6,490,684 B1 | * | 12/2002 | Fenstemaker et al. ....... 713/182 |

OTHER PUBLICATIONS

Ian Mitchell, *Hyperlock counts on growth in DVD Technology*, Jun. 20, 1999, Chicago Tribune Newspaper.
Peerless Systems Corporation's web site as of Jul. 12, 1999 : http://www.peerless.com.

* cited by examiner

*Primary Examiner*—Jeffrey Gaffin
*Assistant Examiner*—Tammara Peyton
(74) *Attorney, Agent, or Firm*—McDermott, Will & Emery

(57) ABSTRACT

A method and system for configuring and/or re-configuring an office device to satisfy each user's particular needs. Such a system allows a user to determine at user defined intervals, i.e., each use, monthly, or project based, what the user's needs are or will be and then access, via the Internet or intranet or some other means, a service center wherein the user can download or access via a code the desired, appropriate applications for the device.

20 Claims, 3 Drawing Sheets

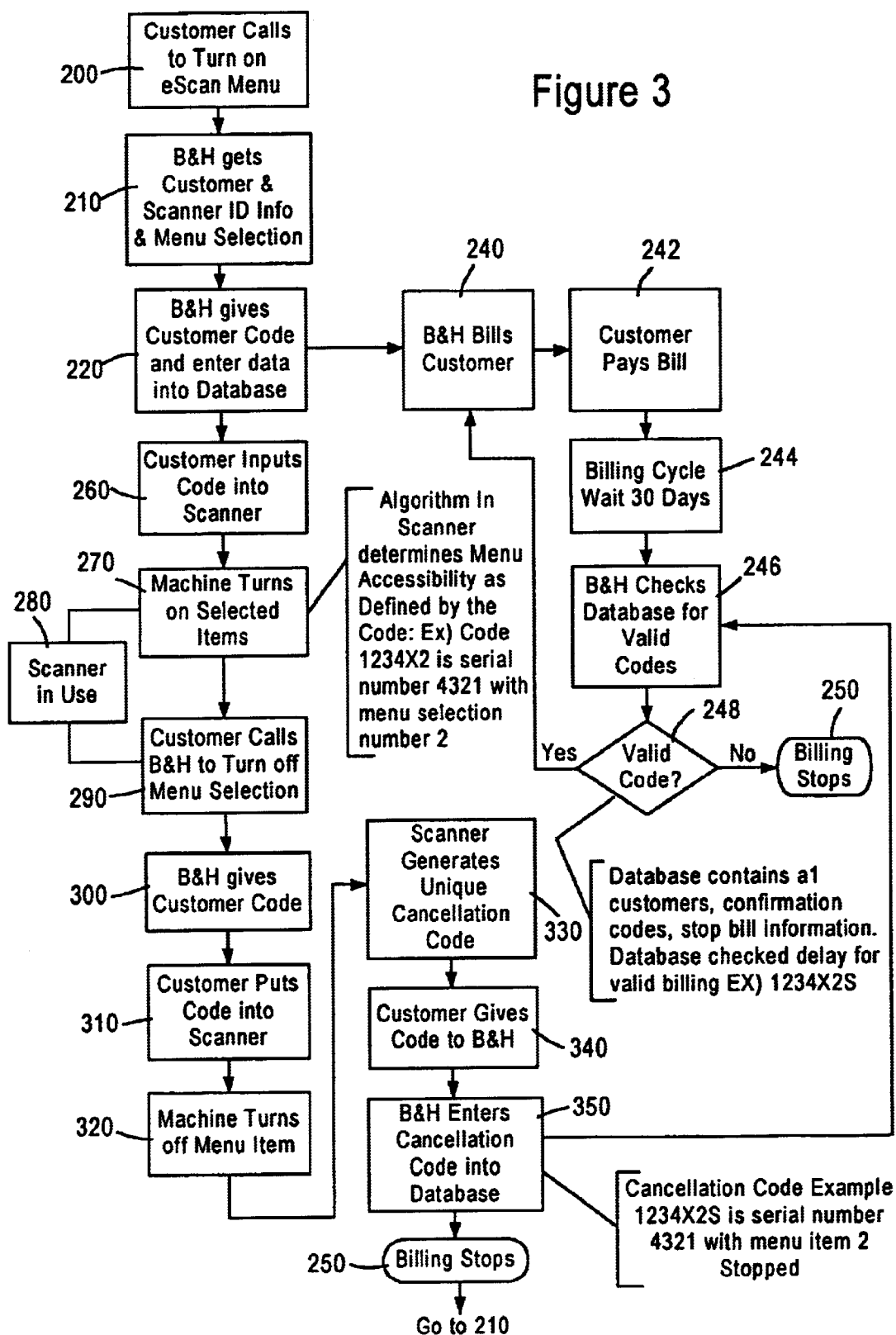

METHOD AND SYSTEM TO REMOTELY CONFIGURE BUSINESS OFFICE DEVICES TO USER DEFINED PARAMETERS

The present invention relates to the remote configuration of business and home office devices, such as, scanners, printers, copiers and the like. Particularly, the present invention relates to a method and system to allow a user to selectively and remotely enable and disable various features of the office device through communication with an office device provider. The present invention specifically allows an office device provider to produce one standard model device and then remotely configure, reconfigure, update and provide technical support and maintenance of the office device pursuant to the user is request, providing for flexible billing arrangements.

BACKGROUND OF THE INVENTION

It is known that m ore and more business and individuals are relying upon microprocessors and microprocessor-based devices for their office and home-office needs. Despite the multitude of manufacturers and the wide range of choices they provide to each consumer, consumers are finding it difficult to find exactly what they need for their particular use. As consumers base purchase decisions on costs, they inevitably find that the device they need costs much more than they can spend and the device they are able to afford does not provide the full range of services they need. The present invention provides for a method and system to alleviate this costly and inefficient dilemma faced by businesses and consumers alike by providing a means to configure their particular device to fit their particular needs, and moreover, allow for reconfiguration of the device as their needs change.

DESCRIPTION OF THE RELATED ART

There does not exist in the art a means of configuring a business office device from a remote site through the Internet or other electronic means. The prior art provides for a means to contact a business office device from a remote site and conduct a diagnostic test upon said device to determine any problems and, if any, attempt to repair those problems through connection-less electronic means.

U.S. Pat. No. 5,887,216 to Motoyama ('216) represents such a method and system. Motoyama '216 discloses a method and system to monitor the actions of a user to determine if the device is operating properly. Motoyama '216 discloses a system wherein an office device communicates, preferably through connection-less means, with a diagnostic service center wherein said center is made aware of the problems in the office device. Motoyama '216 further provides for a method wherein a diagnostic service center conducts through a connection-less telephone call repairs upon the device. Motoyama '216 does not teach, disclose, or suggest a method of reconfiguring an office device through electronic means, thereby, distinguishing itself from the present invention.

U.S. Pat. No. 5,649,120 to Motoyama ('120) discloses a method and apparatus for controlling various modules of a device across models and products. Motoyama '120 allows for a field service organization to utilize one intelligent system to control various models rather than several different systems. The instant invention, however, teaches a method for configuring a base business office device from a remote site in accordance with a user's request wherein applications of said business device are enabled, disabled, and updated.

U.S. Pat. No. 5,894,416 to Kuroyanagi et al. teaches a communication means for communicating with a centralized control system wherein the centralized control system controls a plurality of equipment through a control means based upon control data stored in a storage means. Kuroyanagi teaches a system in which the control means rewrites the control data stored in the storage means with data received from the centralized control system. Kuroyanagi, however, does not teach, suggest, or disclose a system for configuring via the Internet or other electronic communication means the business office device such that particular applications of said business office device are enabled or disabled.

U.S. Pat. No. 5,754,748 to Rivers et al. teaches a device and method wherein routines are downloaded or permanently stored in the device so that additional interpreter languages can be added to a printer by utilizing routines already stored on the device. However, the instant invention provides a system for downloading configuration information so that specific capabilities of the business office device are enabled or, in the alternative, disabled. This method is not taught, disclosed, or even suggested by Rivers et al.

Martin et al., U.S. Pat. No. 5,720,015, discloses a method and apparatus for transferring printer memory data from a host device to any number of peripheral terminals. The instant invention, however, does not teach the transfer of memory data from one device to another. It discloses a system wherein capabilities of the business office device can be enabled or disabled depending upon the configuration information provided to a user.

SUMMARY OF THE INVENTION

Inefficiency and consumer frustration can be alleviated by providing a means and corresponding method to not only communicate with an office device, but to provide a method to configure and/or re-configure the device to satisfy each user's particular needs. Such a system allows a user to determine at user defined intervals, i.e., each use, monthly, or project based, what the user's needs are or will be and then access, via the Internet or intranet or some other communications means, a service center wherein the user can download and/or access the desired, appropriate feature configurations for the device.

The present invention provides for remote configuration of a base model office device, such as for example a limited feature scanner. A base limited feature scanner can be configured remotely through the present invention so that the limited feature scanner's capabilities are enhanced and/or modified based on the needs and desires of the user. The scanner can then operate in its enhanced and/or modified state for a user defined interval, i.e., monthly or per use of enhanced features. The user can thus pay for only the features desired at any given time for any desired periods of time.

It is therefore an object of this invention to provide a method and system for allowing a user to configure the capabilities of an office device from a remote site through communication means, such as the Internet, Intranet, satellite, wireless, modem connection link, access codes provided via telecommunications, etc.

It is a further object of this invention to provide a method and system wherein the capabilities of a business office device can be limited and/or expanded from a remote site based upon the needs and desires of each individual user.

It is another object of this invention that a remote configuration of the capabilities of an office device be achieved at user selected intervals.

It is an additional object of this invention to provide a system for remotely analyzing the operating parameters of a business office device and updating those parameters as new configuration information becomes available or developed.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing may be had by reference to the accompanying drawings wherein:

FIG. 3 is a flow chart of an alternate embodiment of the method of the present invention.

DESCRIPTION OF THE PREFERRED EMBODIMENTS

Figure 1:
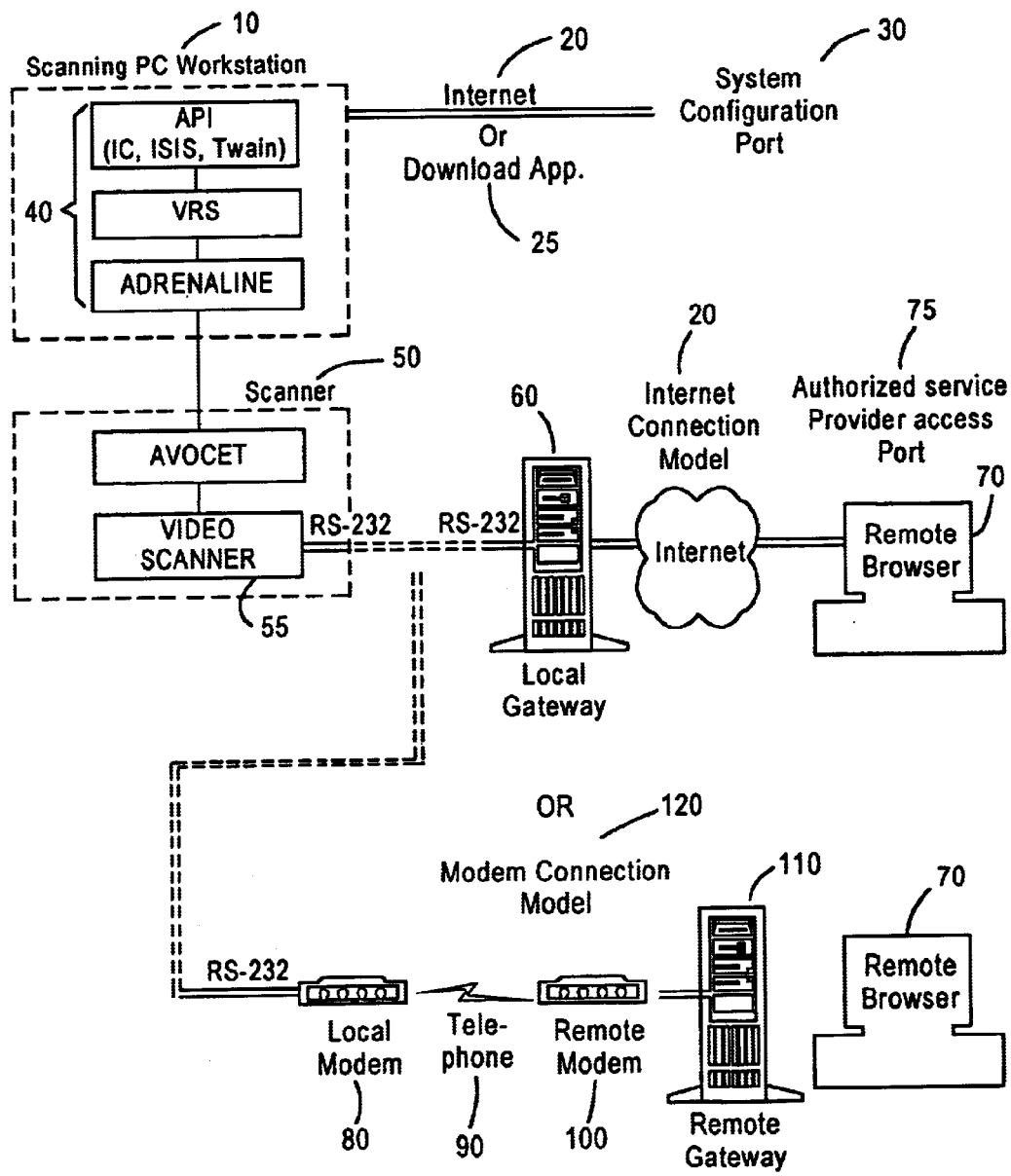
FIG. 1 is a schematic of a system of the present invention in which user defined or user selected configuration of soft and hard features of a limited feature scanner can be achieved remotely.

While the invention is susceptible of embodiment in many different forms, there is shown in the drawings and will be described herein in detail a preferred embodiment of the invention. It should be understood however that the present disclosure is to be considered an exemplification of the principles of the invention and is not intended to limit the spirit and scope of the invention and/or claims of the embodiment illustrated. For example, while the present invention is described herein with reference to a scanner, it should be understood that the present invention can be used in connection with a printer, copier, or other devices having multiple features of varying degree.

A method and system according to the instant invention will be described below.

FIG. 1 illustrates a system schematic of the present invention. As can be seen, a scanning PC workstation 10 is operatively connected with a scanner 50 (at the user's premises). The PC workstation 10 and scanner 50 include various software layers or soft features 40 and 55 including API (IC, ISIS, Twain), VRS, ADRENALINE, AVOCET, and VIDEO SCANNER. Such features for a scanner are, for example, rated speed, camera type (grayscale, color), image size (DPI, maximum scan width), image processing (thresholding, bar/patch code, deskew, auto-border cropping), color drop-out (R/G/B, form drop-out), exception handling (error trap, too dark/light, folded corner, reject virtual re-scan, dust streaks, border integrity), localization (OI language, manuals), and API (image controls, ISIS, Twain). The method and system of the present invention can change these scanners features and abilities in a number of ways.

For example, the scanner company can install changes into any one or all of the software layers via a system configuration port 30 operatively connected via the Internet 20 or a download application 25 to the scanning PC workstation (PC) 10. Connection to the system configuration port 30 permits a user to alter or update from a remote site the soft features 40 of the PC 10 and the soft features 55 of the scanner 50. The soft features 40 and 55 as configured by the user are then utilized to control the scanning device (limited feature scanner) 50 and the user pays for only those features enabled for only a desired or selected period of time.

Additionally, the limited feature scanner 50 is operatively connected to a local gateway system 60 which is in turn connected to a remote browser 70 via the Internet 20. The remote browser 70 allows access to an authorized service provider access port 75. Access to the authorized service provider access port 75 allows configuration of the Video Scanner layer 55 of the limited feature scanner 50 and provides scanner diagnosis and preventative maintenance.

In an alternate embodiment of the invention, connection to the remote browser 70 is achieved through conventional modem-telephone-modem connection 120. In this embodiment, the limited feature scanner 50 utilizes a localized modem 80 to connect via conventional telephonic means 90 to a remote modem 100 that is connected to a remote gateway system 110, in turn connected to remote browser 70.

A feature of the present invention is a user's ability to selectively re-configure the limited feature scanner 50 as the user's needs change. Accessing the system configuration port 75 allows the user to re-configure and/or enable and disable the limited feature scanner's 50 capabilities in accordance with the user's needs, such as alternating the dots per inch parameters, color limitations, scanning speed, etc.

Figure 2:
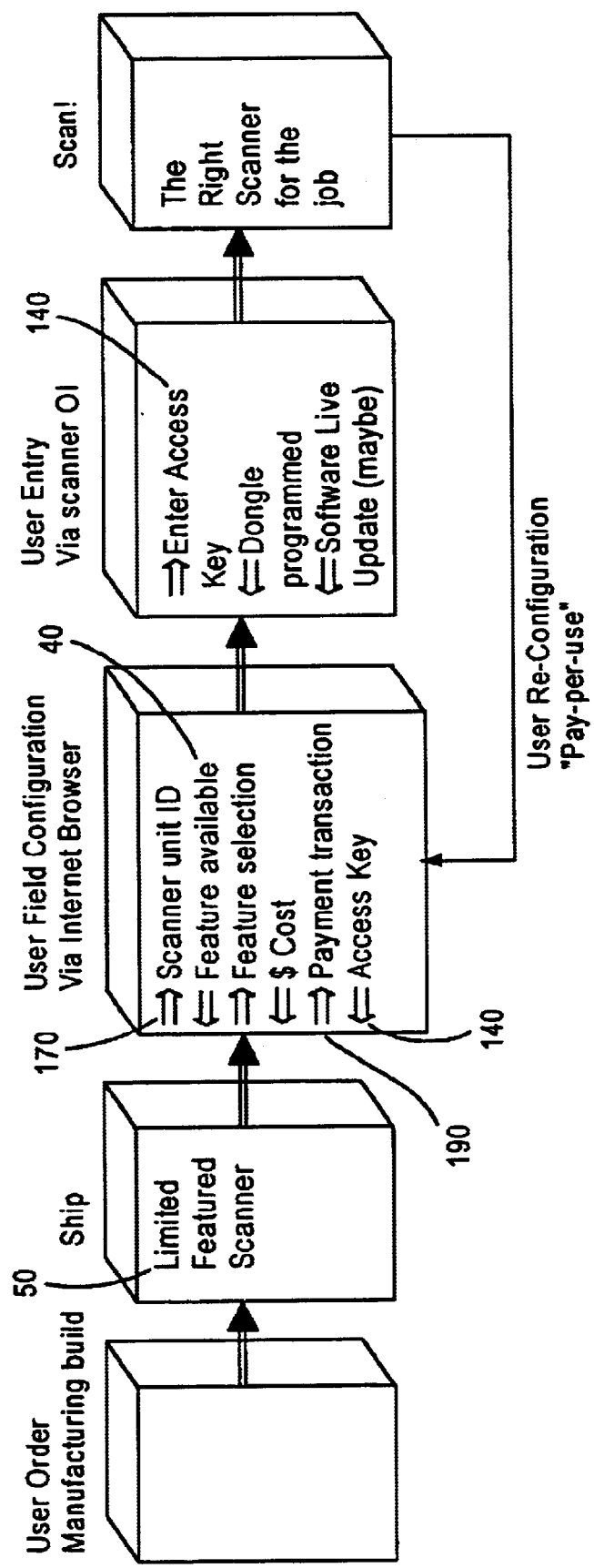
FIG. 2 is a flow chart of the method of the present invention.

FIG. 2 illustrates the method in which a user selects the desired soft features 40 for the limited feature scanner 50. Initially, the user obtains a limited feature scanner from the scanner company. The scanner is equipped to provide a number of features, however, these features are initially disabled and/or set at a minimum level. After accessing the system configuration port 30, the user enters a scanner unit identification number (ID) 170 unique to the user's limited feature scanner 50. The system configuration port 30 confirms the ID 170 and uploads to the user's PC 10 those soft features 40 that are currently available. The user then selects those soft features 40 that he wishes to enable or download to his limited feature scanner 50. Payment 190 for the soft features 40 is then secured via a secured Internet transaction or other secure means. After payment, the user then receives an access key or access code 140 to enter into the scanner for the scanner to configure itself by enable the features selected, and disabling the unselected features when necessary.

The access key 140 is entered into the limited feature scanner 50 either by the user via an alphanumeric keypad on the scanner or via the workstation keypad, or by sending a code or file of information to be loaded into the PC workstation. The limited feature scanner 50 then configures its soft features 40 in accordance with the access key 140 provided to it by the user. The user can then reconfigure the scanner by repeating the above described steps.

In an alternate embodiment of the invention, the system configuration port, utilizing either the internet connection model 20 or the download application 25 enables and/or disables the hard features of the limited feature scanner 50 in accordance with desire or requirements of the user.

FIG. 3 illustrates a flow chart of another embodiment of the present invention in which a user can remotely configure the scanner by telephoning the scanner company, when the user does not have access to a modem or internet connection. In this embodiment, the user calls the scanner company to turn on the desired feature selected from a menu at step 200. The user provides the scanner company the user's information, the scanner ID number, and the desired features at step 210. In turn, the scanner company gives the user an access code at step 220 which will allow the scanner to configure itself. The scanner company maintains a database of the user's information and the access code. The access code can take any form, but preferably is a unique set of letters and numbers corresponding to any possibly menu selection, i.e., any combination of features.

Once the access code is provided to the user, the billing cycle commences and the customer is billed at step 240. The customer inputs the access code into the scanner at step 260, and the scanner configures itself or enables the selected menu items, at step 270.

The user is then free to use the scanner with the selected features at step 280 for a desired period of time. During this time, the customer is billed (step 240) and payment is made (step 242) repeatedly over a set period of time, for example 30 days (set 244). During this set period of time, the scanner company checks the database daily for a valid code and the absence of a cancellation code (step 246). The customer is billed for each day during the billing period that there is a valid code (step 248).

When the user no longer desires to use the selected features, or wishes to change or add features, the user calls the scanner company to disable the previously selected features or combination of features (step 290). The scanner company gives the the user a termination code (step 300) to enter into the scanner (step 310). Once entered, the scanner disables the previously selected features (step 320) and generates a unique cancellation code (step 330) which is displayed to the user. The user then tells the scanner company what the cancellation code is (step 340) and the scanner company enters the cancellation code into the database (step 350). Once the cancellation code is entered into the database, the next time the database is checked for a valid code (step 246) the cancellation code will be detected and the billing will stop (step 250). The user can then proceed to select new features (step 210) or simply end scanner use until a later date.

It should be understood that the embodiments herein described are merely illustrative of the principles of the present invention. Various modifications may be made by those skilled in the art without departing from the spirit or scope of the claims which follow.

What is claimed is:

1. A method for configuring a business office device having at least one hardware component operable at a plurality of physical parameters, the method comprising the steps of:

selecting configuration information relating to at least one of the plurality of physical parameters;

generating an access code corresponding to the selected configuration information;

entering said access code into said business office device; and configuring the at least one hardware component of the business office device according to said configuration information.

2. The method according to claim 1 further comprising the step of dperforming a diagnostic operation within said business office device, such that the physical parameters at which the at least one hardware component is operating are analyzed.

3. The method according to claim 2 further comprising the step of comparing the physical parameters to default parameters, such that deviations from said default parameters are determined.

4. The method according to claim 3 further comprising the step of transmitting a message that the physical parameters deviate from said default parameters.

5. The method according to claim 4, wherein said message is an electronic message, telephonic message, or facsimile message.

6. The method according to claim 2 further comprising the step of comparing said configuration information to a database of configuration information to determine if said configuration information is in an outdated condition.

7. The method according to claim 6, wherein said database of configuration information is stored at a remote location.

8. The method according to claim 6 further comprising the steps of replacing the outdated configuration information with updated configuration information.

9. The method according to claim 8 further comprising the step of downloading said updated configuration information to said business office device.

10. The method according to claim 9 further comprising the step of installing said updated configuration information in said business office device.

11. The method according to claim 10, wherein said at least one hardware component is configured in accordance with said updated configuration information.

12. The method of claim 1, wherein said business office device is a printer, a scanner or a copier.

13. A method for remotely configuring an office device having at least one hardware component operable at a plurality of operating parameters, the method comprising the steps of:

selecting configuration information defining at least one of the plurality of operating parameters of the at least one hardware component;

contacting a remote service provider to obtain an access code for the selected configuration information; and receiving and entering an access code corresponding to said configuration information, said access code instructing said office device to configure the at least one hardware component of said device according to said configuration information.

14. The method of claim 13 further comprising the steeps of:

contacting said remote service provider to disable the selected operating parameters of the at least one hardware component; and receiving a termination code, said termination code instructing said office device to disable the selected operating parameters.

15. The method of claim 14 further comprising the steps of:

billing a user for use of the device at the selected operating parameters; and generating a cancellation code upon entry of said termination code, said cancellation code terminating said step of billing.

16. A method of selectively configuring an office device via communication with a remote service provider system to provide select levels of use of physical capabilities of at least one hardware component of said office device, and for generating billing rates according to said select levels of use at select time intervals, said method comprising the steps of:

communicating to said remote service provider system an identification of said office device;

providing a list of the levels of use of physical capabilities of the at least one hardware component available for said office device;

selecting at least one level of use of the at least one hardware component as desired;

generating an access code corresponding to the selected at least one level of use;

entering said access code to instruct configuration of the at least one hardware component;

configuring the at least one hardware component according to the selected at least one level of use; and determining a billing rate according to the selected at least one level of use of the at least one hardware component and commencing billing.

17. The method of claim 16, further comprising the step of:

generating a termination code upon configuring said office device.

18. The method of claim 17, further comprising the step of:

entering said termination code to return the at least one hardware component to a default value.

19. The method of claim 18, further comprising the step of:

generating a billing cancellation code upon returning the at least one hardware component to a default value.

20. The method of claim 19, further comprising the step of:

communicating to said remote service provider system said billing cancellation code to stop billing.

* * * * *